May 8, 1934. F. T. MOORE ET AL Re. 19,159
REVERSIBLE FEED MECHANISM FOR MACHINE GUNS
Original Filed May 23, 1930
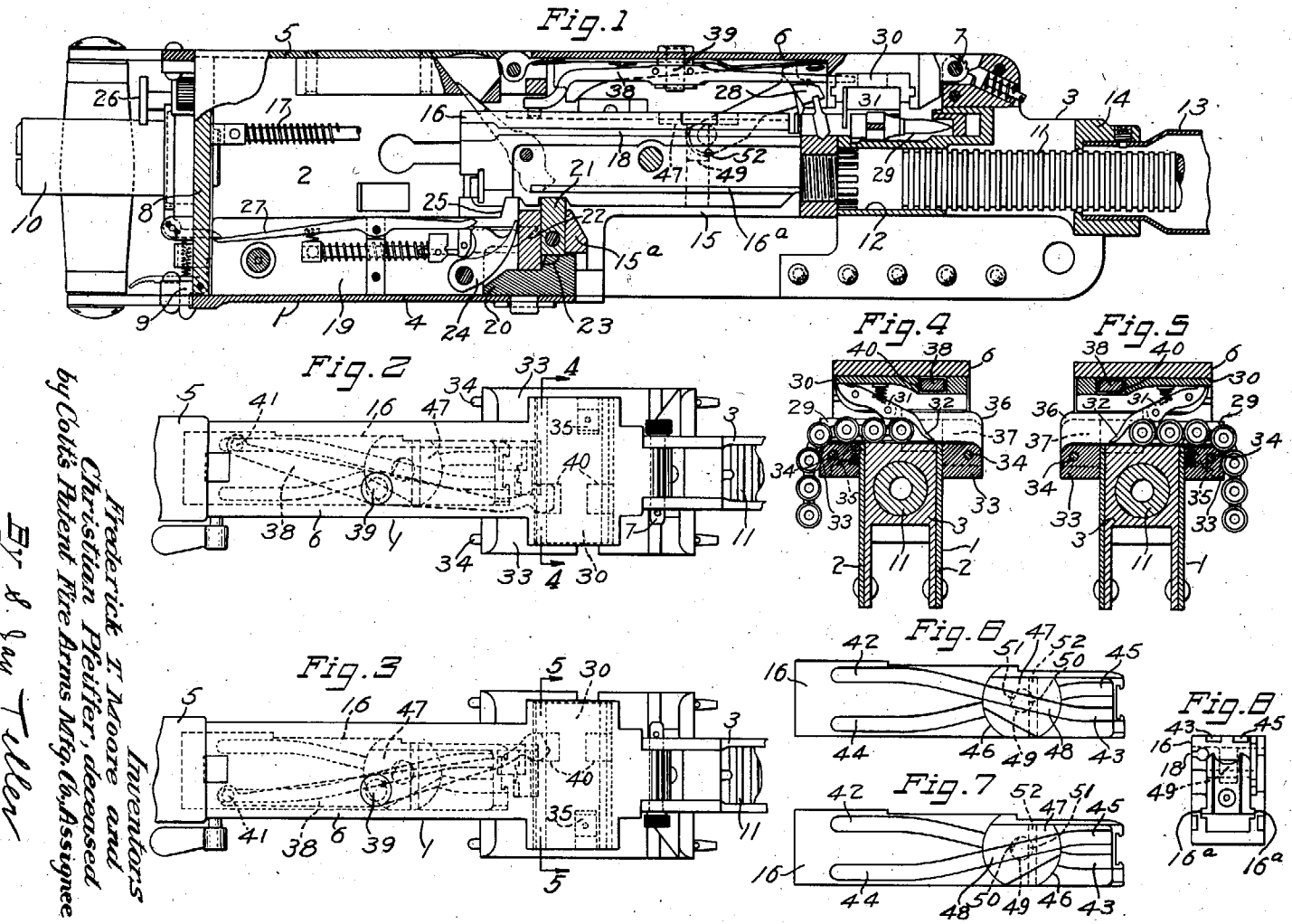
Inventors
Frederick T. Moore and
Christian Pfeiffer, deceased
by Colt's Patent Fire Arms Mfg. Co., Assignee
By S. Jay Teller
Attorney Reissued May 8, 1934

Re. 19,159

UNITED STATES PATENT OFFICE 19,159

REVERSIBLE FEED MECHANISM FOR MACHINE GUNS

Frederick T. Moore, East Hartford, and Christian Pfeiffer, deceased, late of Hartford, Conn., by Colt's Patent Fire Arms Manufacturing Company, assignee, Hartford, Conn., a corporation of Connecticut Original No. 1,803,351, dated May 5, 1931, Serial No. 455,019, May 23, 1930. Application for reissue March 1, 1933, Serial No. 659,244

24 Claims. (Cl. 89—33)

It is frequently desirable in machine gun practice to be able to effect the feeding of the cartridge belt in either direction, that is, from left to right or from right to left. The principal object of the present invention is to provide a simple and reliable mechanism whereby feeding in either direction may be effected. In accordance with the invention, the construction is such that reversal of the direction of feed may be effected without the use of any additional or substitute parts.

In the accompanying drawing there is shown a machine gun similar in many respects to that shown in the patent of Christian Pfeiffer for Automatic firearms, No. 1,803,349 dated May 5, 1931, to which reference may be had for various details not herein fully disclosed. It will be understood, however, that the details of construction disclosed in the said patent have been here shown merely for purposes of illustrating the invention, and it will be further understood that the drawing is not to be construed as defining or limiting the scope of the invention, the claims forming a part of this specification being relied upon for that purpose.

Of the drawing:

Fig. 1 is a vertical longitudinal sectional view through a machine gun embodying the invention.

Fig. 2 is a fragmentary plan view.

Fig. 3 is a view similar to Fig. 2 but showing certain parts of the feed mechanism in different positions.

Fig. 4 is a transverse sectional view taken along the line 4—4 of Fig. 2.

Fig. 5 is a transverse sectional view taken along the line 5—5 of Fig. 3.

Fig. 6 is a detail plan view of the breech bolt.

Fig. 7 is a view similar to Fig. 6 but showing the movable cam element in a different position.

Fig. 8 is a front view of the breech bolt.

The machine gun as shown in the drawing comprises a breech casing 1 which contains the breech mechanism, this casing being rectangular in form and having two side plates 2, 2 connected at the front with a trunnion block 3. The rear part of the bottom of the casing is closed by a transverse bottom plate 4 and the rear part of the top of the casing is closed by the top plate 5. In front of the plate 5 there is also provided a cover 6 pivoted at 7 so that it can be swung upward to expose the interior parts. The casing is closed at the rear by means of a plate 8 which is vertically movable in grooves (not shown) formed in the two side plates 2. The plate 8 is held in place by a manually releasable pivoted latch 9. The plate 8 carries a buffer mechanism indicated as an entirety by 10.

Projecting from the casing at the front is a barrel 11 which upon recoil is movable rearward to a limited extent. The barrel extends through a bearing aperture 12 in the trunnion block 3 and it has another bearing at or near the forward end of the barrel jacket 13, the said jacket being carried by a flange 14 formed on the trunnion block. Connected with the barrel 11 at the rear end thereof and bodily movable therewith is a barrel extension 15. This barrel extension comprises two integrally formed side members which are connected at the rear by a recessed cross member 15[a].

Mounted on the barrel extension for longitudinal movement independently thereof is a breech bolt 16. This breech bolt is provided at its opposite sides with longitudinal tongues 16[a] adapted to enter longitudinal grooves formed in the side members of the barrel extension. A reaction spring 17 is provided which extends into a longitudinal opening 18 in the breech bolt and which tends to hold the breech bolt in its forward position. Upon recoil this reaction spring is compressed and immediately tends to return the breech bolt in the forward direction.

Mounted in the rear lower part of the casing is a lock frame 19 comprising two side members lying closely adjacent the side walls 2 of the casing. Immediately in front of the lock frame 19 is a transverse block 20 secured to the bottom wall 4. When the parts are in their forward positions as shown in Fig. 1 the breech bolt is locked to the barrel extension by means of a lock bolt 21 vertically movable in a recess in the transverse portion 15[a] of the barrel extension and entering a notch in the breech bolt. The lock bolt 21 is held in its upper locking position by means of the transverse block 20, but when the barrel extension and breech bolt move rearward, the said lock bolt is moved downward by means of cam surfaces 22 formed at the forward ends of the lock frame 19. This permits the breech bolt to move rearward independently of the barrel extension. When the parts are returned to their forward positions the lock bolt 21 is again moved to locking position by means of the cam surfaces 23 on the block 20.

Transversely pivoted on the lock frame 20 is a rock lever or accelerator 24 having a convex forward facing surface adapted to be engaged by the rear surface of the barrel extension. When the barrel extension moves rearward upon recoil the breech bolt is unlocked therefrom in the manner already described and the accelerator 24 is moved in the counter-clockwise direction. The upper end of the accelerator engages the surface 25 on the breech bolt and the accelerator thus serves to assist or accelerate the rearward movement of the bolt, acting as a means for transmitting the energy of the relatively heavy barrel extension and barrel to the lighter breech bolt.

The firing mechanism is not shown in detail as it constitutes no part of the present invention. Firing is effected by means of a trigger 26 acting through a lever 27.

Pivotally mounted on the breech bolt at the left side thereof is an extractor 28. The extractor is controlled by suitable cams which are not fully shown as the extractor and its operating means constitute no part of the present invention. As the breech bolt moves rearward the extractor withdraws a cartridge from the feed mechanism at the front. The extractor moves the cartridge rearward and downward so that, upon the return movement of the breech bolt, the cartridge is pushed into the firing chamber at the rear end of the barrel ready to be fired.

Extending transversely through the gun near the front thereof is a feed channel 29 into which a cartridge belt may be fed either from the left or from the right. Mounted in a downward extension of the cover 6 immediately above the feed channel 29 is a feed slide 30 which is adapted to move transversely. This slide 30 carries a pawl 31 which is adapted to engage the forward cartridge of the cartridge belt to move it into firing position as shown in Fig. 4 or in Fig. 5. The slide 30 with the pawl 31 thereon is bodily reversible so as to be adapted to feed the belt from left to right as shown in Fig. 4 or from right to left as shown in Fig. 5. The pawl 31 preferably carries an extension 32 which is adapted to be secured thereto at the rear side thereof. When the slide and pawl are reversed as already referred to, this extension 32 is transferred from one side to the other so that in either case it is at the rear.

At the sides of the gun are blocks 33, 33 located immediately below the feed channel and serving to form the end portions thereof. Pins 34, 34 extend longitudinally through holes in these blocks and on one of these pins there is located a pawl 35 adapted to engage one cartridge of the belt to prevent backward movement thereof. When the belt is to be fed from left to right as shown in Fig. 4 the pawl is located at the left, and when the belt is to be fed from right to left as shown in Fig. 5, the pawl is located at the right. For limiting the movement of the front cartridge of the belt there are preferably provided suitable stops 36 and 37 which are held in place by means of one of the pins 34. When the feed is from left to right the said stops are at the right and when the feed is from right to left the said stops are at the left.

For operating the slide 30 there is provided a movable device adapted to operably engage suitable cam paths movable with or formed on the breech bolt 16. Preferably the said device is a lever 38 pivotally mounted on a stud 39 projecting downward from the cover 6. The slide 30 is provided with two notches 40, 40 and the forward end of the lever 38 projects into one or the other of these notches according to the position of the slide. At its rear end the lever 38 is adapted to operably engage the aforesaid cam paths which are ordinarily formed by means of grooves in the upper face of the bolt, and in this case the lever 38 is provided with a depending stud 41 adapted to extend into the grooves.

In accordance with the present invention there is provided a cam means having two oppositely inclined overlapping or intersecting cam paths, the said cam means being movable simultaneously with the breech bolt and being preferably on the upper face thereof. One of the cam paths is adapted for use in feeding the cartridge belt from left to right and the other of them is adapted for use in feeding the cartridge belt from right to left. These cam paths are ordinarily formed by means of grooves in the upper face of the breech bolt and this grooved construction will now be described in detail.

There are two grooves 42 and 43 which form parts of the cam path used for feeding from left to right and there are two grooves 44 and 45 forming parts of the cam path used for feeding from right to left. These two cam paths are oppositely inclined and they preferably intersect at their central portions. Preferably the portions of the cam paths formed directly on the breech bolt itself are incomplete, being interrupted adjacent the position of intersection. As shown the breech bolt is provided with a recess 46 at the position of intersection and the several grooves 42, 43, 44 and 45 all terminate at the said recess. The recess 46 is normally filled or substantially filled by means of a cam block 47 which has a groove 48 therein. The cam block 47 is adapted to occupy either of two positions as shown respectively in Figs. 2 and 6 and in Figs. 3 and 7. When the cam block 47 is in the position shown in Figs. 2 and 6 the groove 48 therein connects the two grooves 42 and 43 to complete one cam path, and when the cam block is in the position shown in Figs. 3 and 7 the groove 48 therein connects the two grooves 44 and 45 to complete the other cam path. Preferably the recess 46 has cylindrical boundary walls and the block 47 is similarly cylindrical. The block 47 can, therefore, be oscillated to either of its operative positions as required, without being removed from the breech bolt.

In order that the block 47 may be held in place it is preferably provided with a stem 49 which projects into a hole in the breech bolt. The stem 49 is provided with notches 50 and 51 at substantially opposite sides adapted to receive a locking pin 52. When the pin is entered in the notch 50 as shown in Fig. 6 the block 47 is locked in one position and when the pin is entered in the notch 51 as shown in Fig. 7 the block 47 is locked in the other position.

When the cam block 47 is in the position shown in Fig. 6 with the stud 41 entered in the cam path formed by the grooves 42, 48 and 43, the lever 38 will be moved in the counter-clockwise direction as the breech bolt moves rearward. The lever moves the slide 30 far enough toward the left to enable the pawl 31 to engage the next cartridge of the belt, it being understood that in the meantime the first cartridge thereof has been withdrawn by the extractor already described. As the breech bolt again moves forward the lever 38 is rotated in the clockwise direction, thus moving the slide 30 and the pawl 31 toward the right and advancing the forward cartridge of the belt to the position shown in Fig. 4.

When it is desired to effect feeding from right to left instead of from left to right the cam block 47 is placed in the position shown in Fig. 7 and the stud 41 is entered in the cam path formed by the grooves 44, 48 and 45. The feed slide and the parts associated therewith are transferred to their reversed positions as shown in Fig. 5. The action of the feeding mechanism is exactly as already described except for the reversal of the directions of movement. The slide 30 is initially moved from left to right so that upon the return movement the cartridge will be fed from right to left.

What is claimed is:

1. In an automatic firearm, the combination of a breech casing having a transverse cartridge feed channel therein, a breech bolt in the casing movable rearward upon recoil and provided with means forming parts of two oppositely inclined intersecting cam paths, at least a part of each cam path having a fixed relationship with the breech bolt, and means adapted for feeding cartridges through the feed channel in either direction and including a lever pivoted to the casing and having means thereon adapted to operably engage either of the said cam paths.

2. An automatic firearm as set forth in claim 1, wherein the means forming parts of the cam paths are grooves in the upper face of the breech bolt.

3. In an automatic firearm, the combination of a breech casing having a transverse cartridge feed channel therein, a breech bolt in the casing movable rearward upon recoil and provided with means forming incomplete parts of two oppositely inclined overlapping cam paths, means adapted for feeding cartridges through the feed channel in either direction and including a lever pivoted to the casing and having means thereon adapted to operatively engage either of the said cam paths, and means carried by the breech bolt for completing either of the said cam paths to render it effective to operate the lever while the other path remains ineffective.

4. An automatic firearm as set forth in claim 3, wherein the means forming parts of the cam paths are grooves in the upper face of the breech bolt.

5. An automatic firearm as set forth in claim 3, wherein the two cam paths intersect at their central portions.

6. An automatic firearm as set forth in claim 3, wherein the last said means is a single element having two different positions.

7. In an automatic firearm, the combination of a breech casing having a transverse cartridge feed channel therein, a breech bolt in the casing movable rearward upon recoil and provided with means forming incomplete parts of two oppositely inclined intersecting cam paths, means adapted for feeding cartridges through the feed channel in either direction and including a lever pivoted to the casing and having means thereon adapted to operatively engage either of the said cam paths, and means carried by the breech bolt for completing either of the said cam paths to render it effective to operate the lever while the other path remains ineffective.

8. An automatic firearm as set forth in claim 7, wherein the means forming parts of the cam paths are grooves in the upper face of the breech bolt.

9. An automatic firearm as set forth in claim 7, wherein the two cam paths intersect at their central portions, and wherein the pivotal axis of the element carried by the breech bolt is at the intersection of the two cam paths.

10. In an automatic firearm, the combination of a breech casing having a transverse cartridge feed channel therein, a breech bolt in the casing movable rearward upon recoil and provided with means forming parts of two oppositely inclined intersecting cam paths, at least a part of each cam path having a fixed relationship with the breech bolt, and means adapted for feeding cartridges through the feed channel in either direction and including a movable element carried by the casing and adapted to operably engage either of the said cam paths.

11. In an automatic firearm, the combination of a breech casing having a transverse cartridge feed channel therein, a breech bolt in the casing automatically movable rearward upon firing, cam means movable rearward simultaneously with the breech bolt and forming incomplete parts of two oppositely inclined overlapping cam paths, means adapted for feeding cartridges through the feed channel in either direction and including a movable element carried by the casing and adapted to operatively engage either of the said cam paths, and means bodily movable in unison with the cam means for completing either of the said cam paths to render it effective to operate the feeding element while the other path remains ineffective.

12. In an automatic firearm, the combination of a breech casing having a transverse cartridge feed channel therein, a breech bolt in the casing movable rearward upon recoil and provided with means forming incomplete parts of two oppositely inclined overlapping cam paths, means adapted for feeding cartridges through the feed channel in either direction and including a movable element carried by the casing and adapted to operatively engage either of the said cam paths, and means carried by the breech bolt for completing either of the said cam paths to render the said path effective to operate the feeding element while the other path remains ineffective.

13. In an automatic firearm, the combination of a breech casing having a transverse cartridge feed channel therein, a breech bolt in the casing automatically movable rearward upon firing, cam means movable rearward simultaneously with the breech bolt and forming incomplete parts of two oppositely inclined overlapping cam paths, means adapted for feeding cartridges through the feed channel in either direction and including a movable element carried by the casing and adapted to operatively engage either of the said cam paths, and a single element bodily movable in unison with the cam means and movable relatively thereto to two different positions for completing either of the said cam paths to render it effective to operate the feeding element while the other path remains ineffective.

14. In an automatic firearm, the combination of a breech casing having a transverse cartridge feed channel therein, a breech bolt in the casing movable rearward upon recoil and provided with means forming incomplete parts of two oppositely inclined overlapping cam paths, means adapted for feeding cartridges through the feed channel in either direction and including a movable element carried by the casing and adapted to operatively engage either of the said cam paths, and a single element carried by the breech bolt and relatively movable to two different positions for completing either of the said cam paths to render the said path effective to operate the feeding element while the other path remains ineffective.

15. In an automatic firearm, the combination of a breech casing having a transverse cartridge feed channel therein, a breech bolt in the casing movable rearward upon recoil and provided with means forming incomplete parts of two oppositely inclined intersecting cam paths, a block with a single cam path thereon carried by the breech bolt and relatively movable to bring the said single cam path into register with either of the incomplete oppositely inclined cam paths on the breech bolt, and means adapted for feeding cartridges through the feed channel in either direction and including a movable element carried by the casing and adapted to operatively engage either of the said cam paths.

16. In an automatic firearm, the combination of a breech casing having a transverse cartridge feed channel therein, a breech bolt in the casing automatically movable rearward upon firing, cam means movable rearward simultaneously with the breech bolt and forming incomplete parts of two oppositely inclined intersecting cam paths, means adapted for feeding cartridges through the feed channel in either direction and including a movable element carried by the casing and adapted to operatively engage either of the said cam paths, and a block bodily movable in unison with the cam means and movable relatively thereto about a pivotal axis for completing either of the said cam paths to render it effective to operate the feeding element while the other remains ineffective.

17. In an automatic firearm, the combination of a breech casing having a transverse cartridge feed channel therein, a breech bolt in the casing movable rearward upon recoil and provided with means forming incomplete parts of two oppositely inclined intersecting cam paths, means adapted for feeding cartridges through the feed channel in either direction and including a movable element carried by the casing and adapted to operatively engage either of the said cam paths, and a block carried by the breech bolt and relatively movable about a pivotal axis for completing either of the said cam paths to render it effective to operate the feeding element while the other remains ineffective.

18. In an automatic firearm, the combination of a breech casing having a transverse cartridge feed channel therein, a breech bolt in the casing movable rearward upon recoil and provided with grooves therein forming incomplete parts of two oppositely inclined intersecting cam paths, a pivotally movable block carried by the breech bolt and having a single cam groove therein adapted to register with either cam groove in the bolt to form a complete cam path while the other cam path remains incomplete, and means adapted for feeding cartridges through the feed channel in either direction and including a movable element carried by the casing and adapted to operatively engage either of the said cam paths.

19. In an automatic firearm, the combination of a breech casing having a transverse cartridge feed channel therein, a breech bolt in the casing movable rearward upon recoil and provided in one face with grooves forming incomplete parts of two oppositely inclined intersecting cam paths, means adapted for feeding cartridges through the feed channel in either direction and including a movable element carried by the casing and adapted to operatively engage either of the said cam paths, and a block carried by the breech bolt and relatively movable about a pivotal axis perpendicular to the grooved face for completing either of the said cam paths to render it effective to operate the feeding element while the other remains ineffective.

20. In an automatic firearm, the combination of a breech casing having a transverse cartridge feed channel therein, a breech bolt in the casing movable rearward upon recoil and provided with grooves therein forming incomplete parts of two oppositely inclined intersecting cam paths and also provided with a cylindrical recess at the intersection of the grooves, a block fitting the cylindrical recess in the bolt and pivotally movable therein and provided with a cam groove adapted to register with either cam groove in the bolt to form a complete cam path while the other cam path remains incomplete, and means adapted for feeding cartridges through the feed channel in either direction and including a movable element carried by the casing and adapted to operatively engage either of the said cam paths.

21. In an automatic firearm, the combination of a breech casing having a transverse cartridge feed channel therein, a breech bolt in the casing movable rearward upon recoil and provided with grooves therein forming incomplete parts of two oppositely inclined intersecting cam paths and also provided with a cylindrical recess and a central cylindrical hole at the intersection of the grooves, means adapted for feeding cartridges through the feed channel in either direction and including a movable element carried by the casing and adapted to operatively engage either of the said cam paths, and a block pivotally movable in the cylindrical recess in the bolt and having a stem fitting the cylindrical hole therein, the said block being provided with a cam groove adapted to register with either cam groove in the bolt to form a complete cam path while the other cam path remains incomplete.

22. In an automatic firearm, the combination of a breech casing having a transverse cartridge feed channel therein, a breech bolt in the casing movable rearward upon recoil and provided with grooves therein forming incomplete parts of two oppositely inclined intersecting cam paths and also provided with a cylindrical recess and a central cylindrical hole at the intersection of the grooves, means adapted for feeding cartridges through the feed channel in either direction and including a movable element carried by the casing and adapted to operatively engage either of the said cam paths, a block pivotally movable in the cylindrical recess in the bolt and having a stem fitting the cylindrical hole therein, the said block being provided with a cam groove adapted to register with either cam groove in the bolt to form a complete cam path while the other cam path remains incomplete, and means releasably engaging the stem to prevent removal of the block from the bolt.

23. In an automatic firearm, the combination of a breech casing having a transverse cartridge feed channel therein, a breech bolt in the casing movable rearward upon recoil and provided with grooves therein forming incomplete parts of two oppositely inclined intersecting cam paths and also provided with a cylindrical recess and a central cylindrical hole at the intersection of the grooves, means adapted for feeding cartridges through the feed channel in either direction and including a movable element carried by the casing and adapted to operatively engage either of the said cam paths, a block pivotally movable in the cylindrical recess in the bolt and having a grooved stem fitting the cylindrical hole therein, the said block being provided with a cam groove adapted to register with either cam groove in the bolt to form a complete cam path while the other cam path remains incomplete, and a transverse pin removably mounted in the bolt and entering the groove in the stem to prevent removal of the block from the bolt.

24. In an automatic firearm, the combination of a breech casing having a transverse cartridge feed channel therein, a breech bolt in the casing movable rearward upon recoil and provided with grooves therein forming incomplete parts of two oppositely inclined intersecting cam paths and also provided with a cylindrical recess and a central cylindrical hole at the intersection of the grooves, means adapted for feeding cartridges through the feed channel in either direction and including a movable element carried by the casing and adapted to operatively engage either of the said cam paths, a block pivotally movable in the cylindrical recess in the bolt and having a stem fitting the cylindrical hole and having two separate grooves, the said block being provided with a cam groove adapted to register with either cam groove in the bolt to form a complete cam path while the other cam path remains incomplete, and a transverse pin removably mounted in the bolt and adapted to enter either groove in the stem to hold the block in either of its operative positions.

FREDERICK T. MOORE.
COLT'S PATENT FIRE ARMS MANUFACTURING CO. [L. S.]
*Assignee,*
By S. M. STONE,
*President.*